United States Patent
Sperry et al.

(10) Patent No.: US 11,976,661 B2
(45) Date of Patent: May 7, 2024

(54) SYSTEM AND METHOD FOR EVALUATING THE PERFORMANCE OF A PUMP

(75) Inventors: Ronald Kent Sperry, Los Angeles, CA (US); Subramanya G. Prasad, Redondo Beach, CA (US)

(73) Assignee: Flowserve Management Company, Irving, TX (US)

(*) Notice: Subject to any disclaimer, the term of this patent is extended or adjusted under 35 U.S.C. 154(b) by 0 days.

(21) Appl. No.: 13/089,546

(22) Filed: Apr. 19, 2011

(65) Prior Publication Data

US 2012/0270325 A1  Oct. 25, 2012

(51) Int. Cl.
*F04D 15/00* (2006.01)
*G01N 9/32* (2006.01)
*G01N 11/00* (2006.01)

(52) U.S. Cl.
CPC ........... *F04D 15/0088* (2013.01); *G01N 9/32* (2013.01); *G01N 2011/0053* (2013.01); *Y10T 436/11* (2015.01)

(58) Field of Classification Search
USPC ..... 436/43; 340/853.1, 853.2, 856.4, 870.01, 340/870.02, 870.03, 870.06, 870.09, 340/870.11, 870.12, 870.13, 870.14, 340/870.15, 870.16, 870.17, 501, 506, 340/514, 517
See application file for complete search history.

(56) References Cited

U.S. PATENT DOCUMENTS

| | | | | |
|---|---|---|---|---|
| 2,360,546 | A * | 10/1944 | Cardwell, Jr. | 73/32 R |
| 3,751,192 | A * | 8/1973 | Boyd | E21B 43/128 318/432 |
| 4,911,893 | A * | 3/1990 | Cox | 422/110 |
| 5,841,020 | A * | 11/1998 | Guelich | 73/19.12 |
| 6,260,004 | B1 * | 7/2001 | Hays et al. | 702/183 |
| 7,013,223 | B1 | 3/2006 | Zhang et al. | |
| 7,457,702 | B2 * | 11/2008 | Takamatsu | 701/103 |
| 7,558,699 | B2 * | 7/2009 | Beck et al. | 702/182 |
| 2009/0294174 | A1 * | 12/2009 | Harmer | E21B 47/06 175/45 |
| 2010/0011876 | A1 * | 1/2010 | Vyas | E21B 43/12 73/861.04 |

FOREIGN PATENT DOCUMENTS

| | | | |
|---|---|---|---|
| DE | 197 51 591 A1 | 9/1999 | |
| JP | 58 013190 | 1/1983 | |
| WO | WO 97/24596 | * 5/1997 | ............... G01N 9/00 |

(Continued)

OTHER PUBLICATIONS

"apparent density." Academic Press Dictionary of Science and Technology. Oxford: Elsevier Science & Technology, 1992. Credo Reference. Web. Dec. 13, 2013.*

(Continued)

*Primary Examiner* — Krishnan S Menon
(74) *Attorney, Agent, or Firm* — DINSMORE & SHOHL LLP (57) ABSTRACT

Systems and methods to determine the apparent density of a fluid being displaced by a pump. The apparent density may be determined by comparing an expected torque of the pump to an actual torque of the pump. The apparent density can also be used to detect irregular operating conditions.

13 Claims, 3 Drawing Sheets

(56) References Cited

FOREIGN PATENT DOCUMENTS

WO        WO 97/24596 A1    7/1997

OTHER PUBLICATIONS

Catalysts in Petroleum Refining, 1989 : Proceedings of Conference on Catalysts in Petroleum Refining, Kuwait, Mar. 5-8, 1989, p. 171.*
"friction." The Columbia Encyclopedia. New York: Columbia University Press, 2013. Credo Reference. Web. Dec. 20, 2013.*
"Cavitation." Chambers 21st Century Dictionary. London: Chambers Harrap, 2001. Credo Reference. Web. Dec. 20, 2013.*
MICROMO Micro Motion Solutions. DC Motor Calculations. Apr. 4, 2008.*
Induction Motor Speed Torque Characteristics. Yaskawa Electric America. Oct. 1, 2006.*
Application Considerations for A-C Drives. Connors, Dennis. Reliance Electric Company. 1983.*
PCT International Search Report and Written Opinion dated Jul. 30, 2012, PCT Application No. PCT/US2012/033263 filed Apr. 12, 2012, entitled System and Method for Evaluatingof a Pump Applicant: Flowserve Management Company.
Korean Intellectual Property Office (KIPO) Office Action dated Jul. 12, 2016 in reference to co-pending Korean Patent Application No. 10-2016-7030539 filed Apr. 12, 2012.
Examination Report dated Mar. 15, 2019 pertaining to co-pending Indian Patent Application No. 9159/DELNP/2013.

* cited by examiner

SYSTEM AND METHOD FOR EVALUATING THE PERFORMANCE OF A PUMP

BACKGROUND OF THE INVENTION

The present invention relates generally to evaluating the performance of a pump, and more particularly to systems and methods using sensor measurements to determine the performance of a pump in an ebullated reactor.

Hydrocracking is a chemical process used in the petroleum industry to refine crude oil into usable products such as gasoline, diesel fuel, and other forms of petroleum-based products. In general, crude oil contains large hydrocarbon molecules that have high boiling points and are not desirable in many industrial applications. Hydrocracking utilizes pressure, temperature, and catalysts to break down the larger hydrocarbons into smaller, more usable molecules (e.g., gasoline, kerosene, etc.). Numerous hydrocracking techniques have been developed over the years and a number of refinery designs have developed, as a result.

In many oil refinery designs, one or more ebullated reactors are used as part of the hydrocracking process. Ebullated reactors are typically in a tower configuration and operate by boiling unrefined oil in a catalyst and adding hydrogen. As hydrocracking occurs, liquid and/or vapor containing lower molecular weight hydrocarbons are produced. These lower molecular-weight hydrocarbons are then siphoned off from the ebullated reactor for separating into their respective petroleum products.

Specialized pumps known as ebullating pumps are used within ebullated reactors to recirculate the hydrocarbons and catalyst within the reactors. Hydrocracking catalysts are typically solids that may settle to the bottom of an ebullated reactor over time. In order to prevent this, an ebullating pump provides flow recirculation for the ebullated reactor that maintains the catalyst within a certain area of the ebullated bed. Typically, an ebullating pump takes the clean chemical product from the top of the reactor and recirculates it back through the bottom of the reactor. This action creates a flow of fluid upward inside the reactor, thereby forcing catalyst-heavy fluid above a desired level. Without such fluid motion, catalyst may deposit inside the pump assembly and diminishing the pump's performance.

As the "heart" of an ebullated reactor, the performance of an ebullating pump is key to the hydrocracking process. Maintenance of an ebullated reactor is often difficult and costly, meaning that the early detection of performance degradation in its ebullating pump may be used to prevent more serious repairs to the entire reactor. However, it remains challenging to devise systems and methods that evaluate the performance of an ebullating pump.

SUMMARY OF THE PRESENT INVENTION

In one embodiment, a method for determining an apparent density of a fluid being displaced by a pump having a motor is disclosed. The method includes receiving, at a computer, sensor data indicative of the voltage, current, and temperature of the motor. The method also includes determining an expected torque value for the pump using the sensor data, determining an actual torque for the pump using the sensor data, and using the expected torque and actual torque to determine an apparent density of the fluid. The method further includes using the apparent density to detect an irregular operating condition and generating an alert if an irregular operating condition is detected.

In another embodiment, a pump monitor is disclosed. The pump monitor includes an interface configured to receive sensor data from a voltage sensor, current sensor, and temperature sensor connected to a motor of a pump. The pump monitor also includes a processor and a non-transitory memory connected to the processor. The memory stores instructions that, when executed by the processor, cause the processor to determine an expected torque value for the pump using the sensor data, determine an actual torque for the pump using the sensor data, and use the expected torque and actual torque to determine an apparent density of the fluid. The instructions further cause the processor to use the apparent density to detect an irregular operating condition and to generate an alert if an irregular operating condition is detected.

In yet another embodiment, an ebullating pump system is disclosed. The ebullating pump system includes an ebullating pump having a motor and sensors connected to the motor that measure the voltage, current, and temperature of the motor. The system also includes a pump monitor that receives sensor data from the sensor. The pump monitor stores relationship data in a memory that relates the speed of the pump to torque. The pump monitor also utilizes a processor to determine an expected torque using the sensor data and the relationship data, to determine an actual torque for the pump by using the sensor data, and to determine an apparent density of the fluid by using the expected torque and actual torque. The pump monitor further uses the apparent density to detect an irregular operating condition and generates an alert if an irregular operating condition is detected.

BRIEF DESCRIPTION OF THE DRAWINGS

The following detailed description of specific embodiments can be best understood when read in conjunction with the following drawings, where like structure is indicated with like reference numerals and in which.

The embodiments set forth in the drawings are illustrative in nature and are not intended to be limiting of the embodiments defined by the claims. Moreover, individual aspects of the drawings and the embodiments will be more fully apparent and understood in view of the detailed description that follows.

DETAILED DESCRIPTION OF THE PREFERRED EMBODIMENTS

As stated above, it is challenging and difficult to devise systems and methods that evaluate the performance of an ebullating pump. Maintenance of an ebullating reactor requires specialized machinery and may stop the production of refined petroleum while the maintenance is being performed. While sensors within the reactor may provide additional information about the state of the system, each sensor is also another potential point of failure for the reactor. The present inventors have recognized the need for systems and methods that evaluate the performance of an ebullating pump while minimizing the number of sensors needed for the evaluation.

Figure 1:
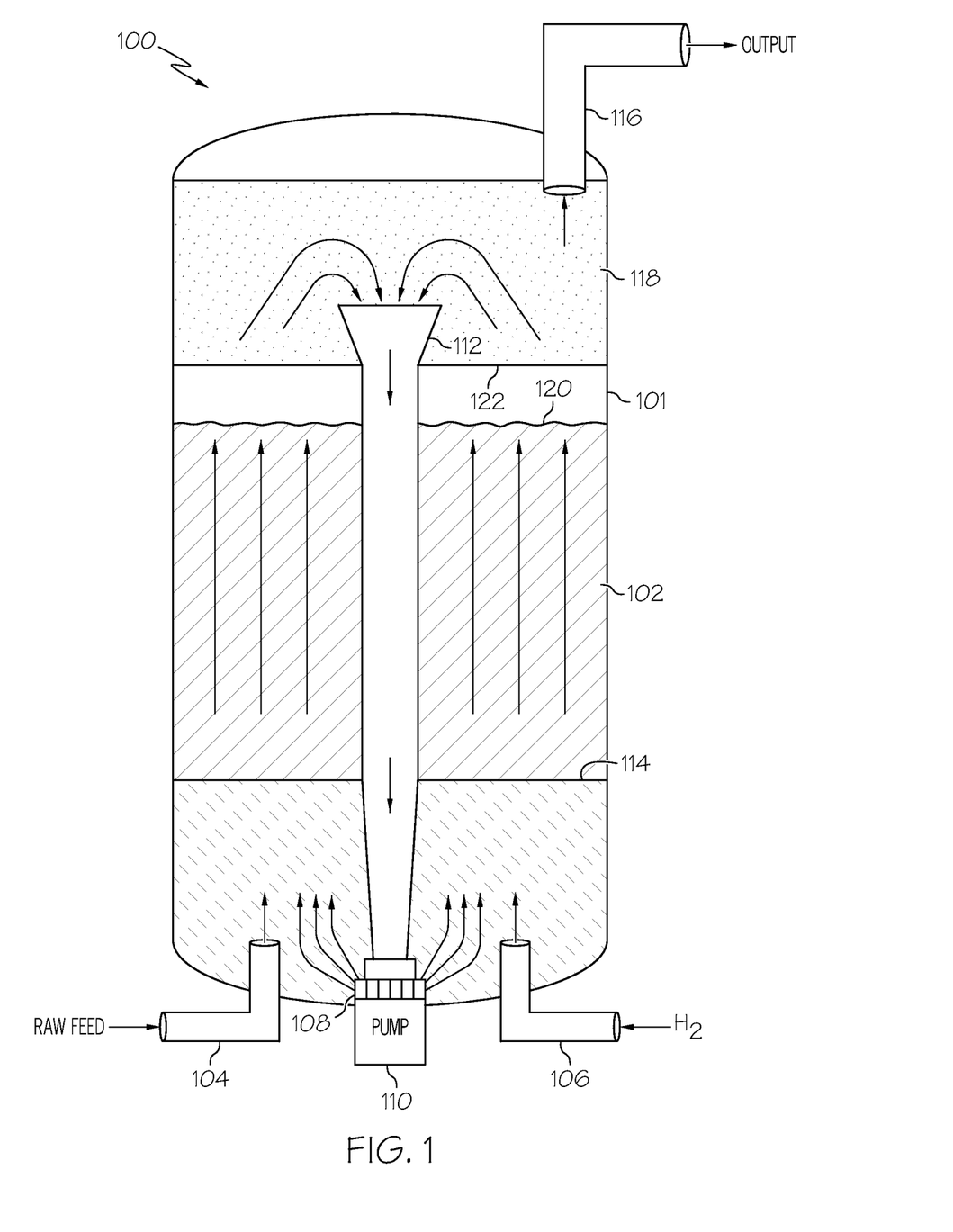
FIG. 1 is a schematic illustration of an ebullating reactor, according to an aspect of the present invention.

Referring now to FIG. 1, ebullated reactor 100 is shown, according to embodiments shown and described herein. Ebullated reactor 100 contains a mixture 102 that may contain hydrocarbons, hydrogen, catalyst, and other chemicals in the form of a liquid and/or gas. Unprocessed hydrocarbons are fed into ebullated reactor 100 via raw feed inlet 104. Similarly, hydrogen gas is also fed into ebullated reactor 100 via hydrogen inlet 106.

Ebullated reactor 100 performs hydrocracking by heating the supplied feed, hydrogen, and catalyst to temperatures that can range upwards of 900° F. or more under pressure. As the hydrogen and raw feed combine, the fluid/gas mixture passes distributor 114 and is forced upwards through vessel 101. A zeolite-based catalyst or other known hydrocracking catalyst causes the heated fluid-catalyst mixture to chemically break down the larger hydrocarbons into smaller hydrocarbons. The fluid 118 containing the broken-down hydrocarbons is then passed from ebullating reactor 100 via outlet 116 to a separator that separates out the different, smaller hydrocarbons contained within fluid 118 (e.g., gasoline, kerosene, etc).

Because the catalyst used for hydrocracking is typically a solid, the catalyst tends to settle within ebullated reactor 100 over the course of time. Ebullating pump 110 prevents the catalyst from settling by constantly recirculating fluid 118 within vessel 101. Suction is provided at pump intake 112, where fluid 118 is forced towards the bottom of ebullated reactor 100 by ebullating pump 110. Ebullating pump 110 then forces fluid 118 through pump outlet 108, thereby creating an upward fluid motion within ebullated reactor 100. In some embodiments, the fluid received by pump intake 112 is also reheated as part of the recirculation process. In this way, catalyst-heavy fluid is maintained between expanded catalyst level 122 and settled catalyst level 120 within ebullated reactor 100.

Although ebullating pump 110 is shown as being external to ebullated reactor 100, it is to be understood that this is merely exemplary and that ebullating pump 110 may be located in any number of locations inside or external to the main housing of ebullated reactor 100. Ebullating pump 110 may be of any number of submersible or non-submersible pump designs suitable for recirculating fluid throughout ebullated reactor 100. In some embodiments, ebullating pump 110 may also be a centrifugal pump or any other type of dynamic pump. In other embodiments, ebullating pump 110 may be a positive displacement pump.

Two irregular operating conditions may lead to performance degradation in ebullated reactor 100. First, a catalyst carryover condition may occur when the catalyst levels within ebullated reactor 100 are not maintained correctly. Catalyst that settles to the bottom of ebullated reactor 100 may clog ebullating pump 110 and must be withdrawn and recycled. Second, a gas entrainment condition may occur when the hydrogen levels are not maintained properly, leading to a build-up of hydrogen at the top of ebullated reactor 100. Early detection of such irregular operating conditions helps to prevent unnecessary wear on components and to ensure the proper operation of ebullated reactor 100.

Both gas entrainment and catalyst carryover may be detected using the apparent density of the medium displaced by pump 110. If the apparent density is greater than expected, additional catalyst may be present in the medium, indicating catalyst carryover. Conversely, if the apparent density is less than expected, additional hydrogen may be present in the medium, indicating gas entrainment. As both conditions are undesirable within ebullated reactor 100, detection of either condition by a pump monitor thereby allows an operator to take corrective measures.

Figure 2:
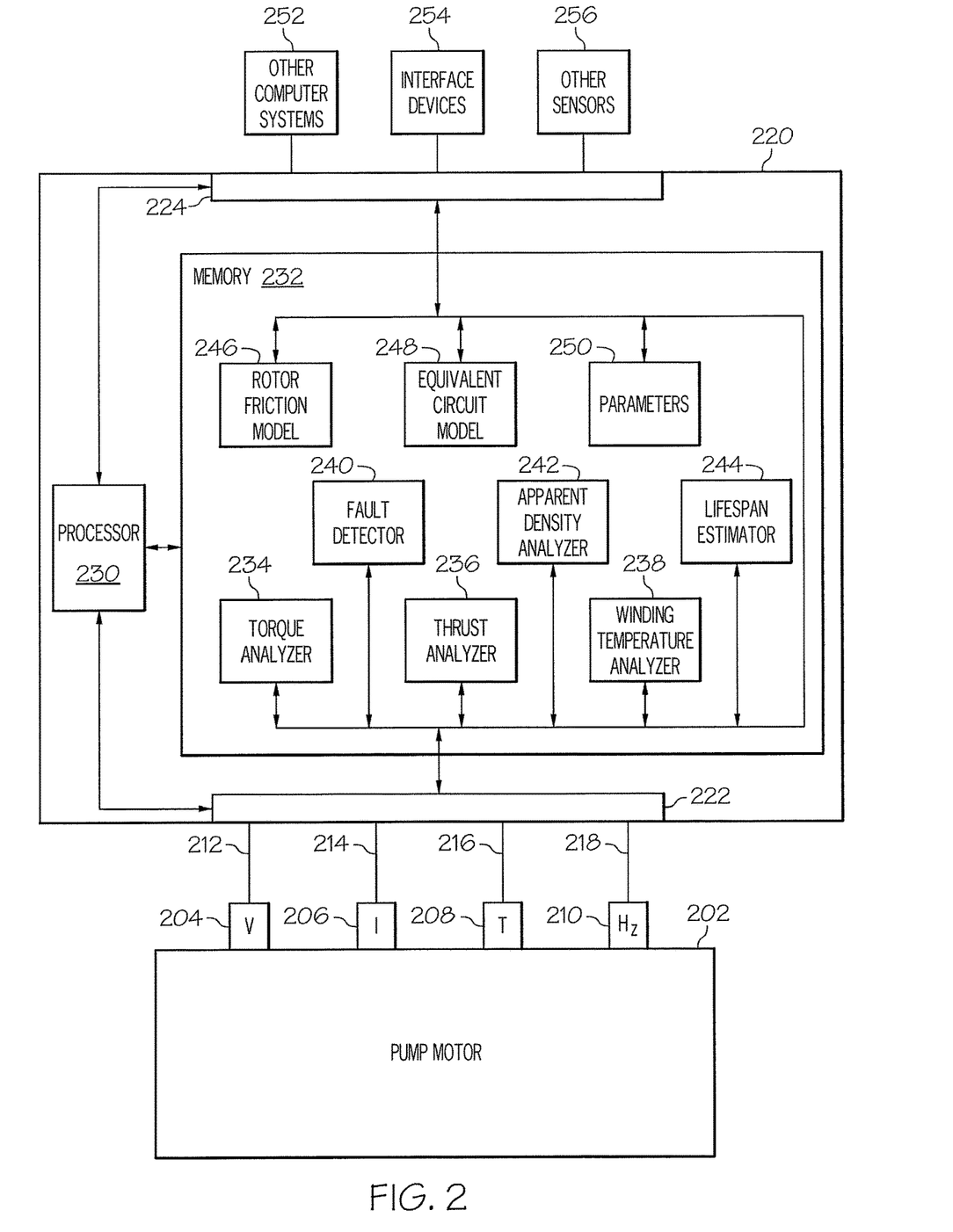
FIG. 2 is a schematic illustration of a pump motor for an ebullating pump, according to an aspect of the present invention.

Referring now to FIG. 2, a schematic illustration of a pump motor for an ebullating pump is shown, according to embodiments shown and described herein. Pump motor 202 provides mechanical power to force catalyst-heavy fluid to recirculate within an ebullated reactor. In various embodiments, pump motor 202 may be an alternating current (AC) or direct current (DC) motor that receives electrical power and converts it to mechanical power. In other embodiments, pump motor 202 may also include a variable frequency drive (VFD) that allows the speed of the motor to be varied. Variation of the speed of pump motor 202 may be used to control the flow rate and other characteristics of the fluid being pumped by the motor.

Pump motor 202 may include a number of sensors to monitor the performance of the pump and the ebullated reactor as a whole. Voltage sensor 204 measures one or more voltages supplied to pump motor 202. Current sensor 206 measures one or more electrical currents supplied to and/or returned from pump motor 202. Temperature sensor 208 measures the temperature of pump motor 202. Where pump motor 202 includes a VFD, frequency controller 210 also tracks the operating frequency used by the VFD to control the operation of pump motor 202. Sensors 204, 206, and 208 may be any number of sensors or configurations to measure the voltages, currents, and temperatures associated with pump motor 202. For example, temperature sensor 208 may be a single temperature sensor, while voltage sensors 204 and current sensors 206 may be a combined integrated circuit that measures both voltage and current. It should be appreciated that any number of different combinations of sensors and sensor configurations may be used, without deviating from the principles or teachings of the present disclosure.

Bus lines 212, 214, 216 and 218 connect frequency controller 210 and sensors 204, 206, and 208 to computing device 220, which monitors and evaluates the performance of the ebullating pump and ebullated reactor. Bus lines 212, 214, 216 and 218 may be any combination of hardwired or wireless connections. For example, bus line 214 may be a hardwired connection to provide voltage readings to computing device 220, while bus line 216 may be a wireless connection to provide current readings to computing device 220. In some embodiments, bus lines 212, 214, 216, and 218 are part of a shared data line that conveys voltage, current, temperature and frequency values to computing device 220. In yet other embodiments, bus lines 212, 214, 216 and 218 may include one or more intermediary circuits (e.g., other microcontrollers, signal filters, etc.) and provide an indirect connection between sensors 212, 214, 216 and computing device 220. In yet further embodiments, computing device 220 may operate as a VFD for pump motor 202 and locally includes frequency controller 210.

Interface 222 is configured to receive the sensor data from sensors 204, 206 and 208 via bus lines 212, 214, and 216 and frequency data from frequency controller 210 via bus lines 218. For example, interface 222 may include one or more wireless receivers, if any of lines 212, 214, 216, or 218 are wireless connections. Interface 222 may also include one or more wired ports, if any of lines 212, 214, 216, or 218 are wired connections. Interface 222 may also include circuitry configured to digitally sample or filter the sensor data from bus lines 212, 214 and 216. For example, interface 222 may sample the current data received from current sensors 206 via bus line 214 at discrete times (e.g., k, k+1, k+2, etc.) to produce discrete current values (e.g., I(k), I(k+1), I(k+2), etc.).

Computing device 220 is shown to include processor 230, which may be one or more processors communicatively coupled to memory 232 and interfaces 222 and 224. Memory 232 may be any form of memory capable of storing machine-executable instructions that implement one or more of the functions disclosed herein, when executed by processor 230. For example, memory 232 may be a RAM, ROM, flash memory, hard drive, EEPROM, CD-ROM, DVD, other forms of non-transitory memory devices, or any combination of different memory devices.

Interface 224 may provide one or more wired or wireless connections between computing device 220 and other computer and electronic devices in a manner similar to interface 222. Computing device 220 may communicate with other computer systems 252 (e.g., another computer, a portable electronic device, a server, etc.) via interface 224. Computing device 220 may also communicate with interface devices 254 (e.g., a display, a touch screen, a keyboard, a mouse, etc.) which allows computing device 220 to convey and receive information from a user. In some embodiments, computing device 220 may also receive sensor data from other sensors 256 located in or near the ebullated reactor (e.g., an external temperature sensor, an internal temperature sensor, catalyst density detectors located within the ebullated reactor, etc.).

Memory 232 includes parameters 250 which may be preloaded onto computing device 220 or received from other computing devices 252 or from interface devices 254 via interface 224. Parameters 250 include data values that control one or more operations of computing device 220. For example, parameters 250 may include a setting that causes computing system 220 to send one or more alerts (e.g., an email, an automated telephone call, a text message, etc.) to other computer systems 252 when one or more conditions are met. In another example, parameters 250 may include threshold values that define one or more ranges for data values when pump motor 202 is operating normally.

Memory 232 also includes rotor friction model 246 and equivalent circuit model 248. Rotor friction model 246 models the amount of friction and other factors relevant to the mechanical operation of pump motor 202 and the ebullating pump. Equivalent circuit model 248 provides a simplified circuit model that simulates the electrical operation of pump motor 202. In some embodiments, rotor friction model 246 and equivalent circuit model 248 may be preloaded into memory 232, while in other embodiments, they may be received from other computing systems 252 and/or from interface devices 254.

Memory 232 also includes winding temperature analyzer 238, which uses equivalent circuit model 248, current data from current sensor 206, and temperature data from temperature sensor 208 to estimate a temperature of the windings of the pump. Since direct measurement of the winding temperature of pump motor 202 is often difficult, winding temperature analyzer 238 estimates the winding temperature indirectly. Equivalent circuit model 248, for example, may treat the windings of pump motor 202 as a resistive load. As current increases through the windings, the temperature of the windings also increases. As the temperature of the windings increases, the resistance of the windings also decreases. When pump motor 202 is inactive and cooled down, winding temperature analyzer 238 stores temperature measurements from temperature sensor 208 and uses the electrical sensor measurements and equivalent circuit model 248 to determine the resistance of the windings. When pump motor 202 has been in operation for an amount of time, similar temperature measurements and resistance calculations are made by winding temperature analyzer 238. If the windings of pump motor 202 are copper, winding temperature analyzer 238 may utilize the following equation:

$$T_w = T_{oil} + \Delta T_n * \left[\frac{I_1}{I_n}\right]^2 * \left[1 + \frac{T_w - T_n}{T_n + 234.5}\right]$$

where $T_w$ is the winding temperature in Celsius, $T_{oil}$ the ambient oil temperature surrounding the windings in Celsius, $I_1$ is the operating current, $I_n$ is the nominal operating temperature, $\Delta T_n$ is the nominal temperature rise, and $I_n$ is the nominal current. Once the winding temperature is known, the winding resistance may be changed using the relationship between winding resistance and temperature and used to update equivalent circuit model 248 for pump motor 202.

Thrust analyzer 236 uses voltage measurements from voltage sensor 204, current measurements from current sensor 206, parameters 250, and/or frequency values from frequency controller 210 to calculate the operating thrust of the ebullating pump. For example, thrust analyzer 236 may perform one or more diagnostic tests and may calculate the speed of pump motor 202 in RPMs, to determine the hydraulic thrust of the ebullating pump. Thrust analyzer 236 may use the determined hydraulic thrust, manufacturer information stored in parameters 250 (e.g., rotating element weight, etc.), and injection oil thrust to determine the operating thrust of the ebullating pump. In one embodiment, the operating thrust $F_b$ may be calculated as follows:

$$F_b = F_{ref} * \frac{\rho_{app}}{\rho_{ref}} * \left[\frac{N_m}{N_{ref}}\right]^2 + F_q * \left[\frac{q}{q_n}\right]^2 + F_w$$

where $\rho_{app}$ is an apparent density of the medium being displaced by the pump (e.g., from apparent density analyzer 242), $\rho_{ref}$ is the expected fluid density (e.g., a reference value stored in parameters 250), $N_m$ is the operating speed of pump motor 202 (e.g., which may be derived using the voltage, current, and/or frequency values), $F_w$ is the dead weight load of the rotor of pump motor 202 (e.g., stored in parameters 250), $F_{ref}$ is the test hydraulic thrust, $N_{ref}$ is the test speed, $F_q$ is the nominal oil injection thrust, q is the oil injection flow rate, and $q_n$ is the nominal oil injection flow rate.

Torque analyzer 234 determines the slip and developed torque of pump motor 202. To determine the developed torque and slip of pump motor 202, torque analyzer 234 may use inputs such as the frequency from frequency controller 210, voltage and current measurements from sensors 204, 206, and stored parameters 250 (e.g., data values provided by the manufacturer of pump motor 202 and set using the no-load, locked rotor and winding tests of the motor). Torque analyzer 234 uses the inputs with equivalent circuit model 248 to determine the slip and the developed torque of pump motor 202. Torque analyzer 234 may also use the frequency input and the previously determined slip to determine the running speed of pump motor 202 for additional processing (e.g., as used by thrust analyzer 236).

Torque analyzer 234 also determines the net motor output torque of pump motor 202. For example, if the ebullating pump is a submersible pump, fluid viscosity and rotational friction losses may also be significant. Torque analyzer 234 may use the temperature measurements from temperature sensor 208, rotor friction model 246, the determined running speed of pump motor 202, and parameters 250 (e.g., data values corresponding to the no-load testing of pump motor 202) to determine the viscosity and rotational friction losses for pump motor 202 when it is in use. Torque analyzer 234 may then determine the net output torque of pump motor 202 by calculating the difference between the developed torque and the rotational losses.

In some embodiments, torque analyzer 234 may also generate or maintain one or more torque-speed relationships and store the related information in parameters 250 (e.g., as a table, database, bitmap, curve, etc.) for later use. In such a case, one or more sets of speed-torque relationships may be stored for different temperatures and frequencies. For example, because the winding resistance in equivalent circuit model 248 may vary with temperature, different speed-torque curves may also be stored to account for the different temperatures.

Apparent density analyzer 242 compares expected torque values and the net output torque values determined by torque analyzer 234 to estimate the apparent density of the fluid passing through the ebullating pump. For example, torque analyzer 234 may determine one or more reference torque and density parameters during a diagnostic run of the ebullated bed and store them in parameters 250. In this way, apparent density analyzer 242 may utilize the relationship between the torque and fluid density to estimate the apparent density of the fluid. In one embodiment, apparent density analyzer 242 uses the following equation to determine the apparent density:

$$\rho_{app} = \rho_{ref} * \frac{\tau_0}{\tau_{ref}}$$

where $\rho_{app}$ is the apparent density, $\rho_{ref}$ is the expected fluid density (e.g., a reference value stored in parameters 250), $\tau_{ref}$ is the expected torque on the pump based on the current operating speed, and), $\tau_0$ is the operating torque determined by torque analyzer 234.

Apparent density analyzer 242 may also use the estimated apparent density values to detect irregular operating conditions within the ebullated reactor. A higher than normal apparent density indicates a catalyst carryover condition (e.g., there is more than expected catalyst present within the fluid). Conversely, a lower than normal apparent density indicates gas entrainment (e.g., there is a higher than expected amount of gas present within the fluid). When either condition is detected, apparent density analyzer 242 may initiate one or more diagnostic routines (e.g., by altering one or more operating parameters of the ebullated bed and/or pump motor 202) and may provide one or more alerts to other computer systems 252 or to interface devices 254. In some embodiments, the alert may be sent automatically. For example, apparent density analyzer 242 may send a text message to other computer systems 252 (e.g., a laptop, a cellular phone, etc.) or provide indicia of the condition to interface devices 254 (e.g., as an alert on a display, etc.), in order to alert a user. In other embodiments, apparent density analyzer 242 may cause the alert to be stored in memory 232 and/or other computer systems 252 for later use. For example, lower priority alerts may be presented to a display only after receiving a request for information about the alerts.

Apparent density analyzer 242 may further determine the volume fraction of gas, oil, and catalyst inside the ebullated reactor. In this case, other sensors 256 may include one or more catalyst density sensors located within the ebullated reactor. Apparent density analyzer 242 may receive the catalyst density measurements and use them with the estimated apparent density values to determine the volume fraction of gas, oil, and catalyst inside the ebullated reactor. Apparent density analyzer 242 may then provide the volume fraction values to other computer systems 252 and/or to interface devices 254 via interface 224.

Lifespan estimator 244 uses the torque values from torque analyzer 234, thrust values from thrust analyzer 236, winding temperatures from winding temperature analyzer 238, apparent density values from apparent density analyzer 242, and/or volume fraction values from apparent density analyzer 242 to estimate component lifetimes for the ebullated reactor. For example, if the winding temperature determined by winding temperature analyzer 238 is above an acceptable threshold, lifespan estimator 244 may adjust the lifespan estimation of pump motor 202 downward. Initial lifespan estimates may be provided by other computer systems 252, interface devices 254, or preloaded into parameters 250. Lifespan estimator 244 also stores and retrieves one or more operating time parameters in parameters 250 that denote the amount of time that a component in the ebullated reactor has been in use. As a component is used, its operating time is subtracted from its initial lifespan estimate by lifespan estimator 244 and adjusted for any conditions that may lead to premature wear (e.g., using the winding temperatures, apparent densities, etc., determined by computing device 220), thereby determining an estimate of the remaining lifetime of the component.

Lifespan estimator 244 also includes one or more reporting features and provides reports to other computer systems 252 and/or to interface devices 254. For example, a plant operator using interface devices 254 may view the torque values, thrust values, apparent density values, etc. in real time or near real-time. In some embodiments, lifespan estimator 244 may also store one or more data values that it receives to provide a history of the data values. For example, lifespan estimator 244 may store the apparent density values from apparent density analyzer 242 over a period of time and generate one or more charts that relate the apparent density values as a function of time. Lifespan estimator 244 may then provide the chart to other computer systems 252 and/or to interface devices 254.

Figure 3:
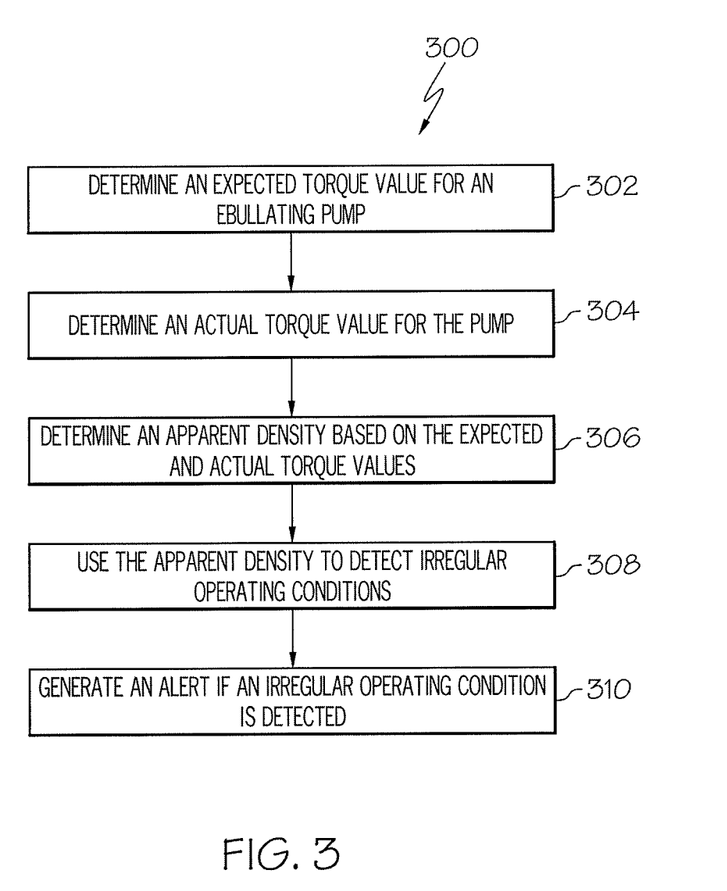
FIG. 3 is a flow diagram of a method for detecting irregular operating conditions in an ebullated reactor, according to an aspect of the present invention.

Referring now to FIG. 3, a method for detecting irregular operating conditions in an ebullated reactor is shown, according to an exemplary embodiment. Irregular operating conditions include, but are not limited to, gas entrainment conditions and catalyst carryover conditions within the ebullated reactor. Other irregular operating conditions may be any operating condition that may be detected using the apparent density of the fluid being displaced by the pump.

Method 300 includes determining an expected torque value for an ebullating pump associated with the ebullated reactor (block 302). The ebullating pump recirculates catalysts and hydrocarbon-containing liquid and/or gas throughout the ebullated reactor. A pump hydraulic performance test may be used at a time in which the ebullated reactor is operating normally to determine one or more baseline torque values and store these values within an electronic memory for future use. These baseline torque values may then be used as expected torque values, since they correspond to the normal operation of the ebullated reactor.

Method 300 also includes determining an actual torque value for the pump (block 304). When the pump is in operation (e.g., the ebullated reactor is performing hydrocracking), data associated with the pump's motor may be used by a processor to determine the actual torque for the pump. In general, the actual torque for the pump may be determined by subtracting a developed torque value by rotational losses. An equivalent circuit model for the motor may be used with the data associated with the motor to determine the motor's slip and developed torque. A frequency value for the motor and the determined slip can then be used to determine the motor's running speed. A rotor friction model may then be used with the running speed and a temperature-dependent viscosity value to determine the rotational losses. The actual torque can then be determined as the difference between the developed torque value and the rotational losses.

Method 300 further includes determining an apparent density of the medium displaced by the pump by comparing the expected and actual torque values (block 306). For example, the apparent density may be determined by multiplying an expected density by the ratio of operating torque to an expected torque. In other embodiments, the amount of rotational losses may be used against a reference value to determine the apparent density.

Method 300 yet further includes using the apparent density to detect irregular operating conditions within the ebullated reactor (block 308). If the apparent density is lower than expected, this may indicate a gas entrainment condition (e.g., a higher than normal amount of gas bubbles present within the fluid). Because gasses tend to have lower densities than that of liquids and solids, a larger amount of gas present in the fluid would lower the fluid's apparent density. If the apparent density is higher than expected, this may indicate catalyst carryover (e.g., a higher than normal amount of catalyst present within the fluid and may leave the ebullated reactor with the processed hydrocarbons). Catalyst carryover is undesirable because it increases the amount of impurities in the fluid leaving the reactor and also increases costs, since additional catalyst would need to be added to the reactor.

Method 300 additionally includes generating an alert if an irregular operating condition is detected (block 310). Any number of computerized alerts may be generated to convey information about the irregular condition. For example, an alert may be sent automatically to an interface device to convey the alert to a user (e.g., a textual message, indicia on a display, an audio alert, etc.). In another example, the alert may be sent to another computing device (e.g., a server, data collection device, etc.) that stores the alert for later recall.

Many modifications and variations of embodiments of the present invention are possible in light of the above description. The above-described embodiments of the various systems and methods may be used alone or in any combination thereof without departing from the scope of the invention. Although the description and figures may show a specific ordering of steps, it is to be understood that different orderings of the steps are also contemplated in the present disclosure. Likewise, one or more steps may be performed concurrently or partially concurrently. While the above-described embodiments are shown in connection with an ebullated reactor, this is to be understood as exemplary only. The systems and methods described herein may be used with any number of different pumping systems and pump designs.

The various operations of the methods and systems in the present disclosure may be accomplished using one or more processing circuits. For example a processor may be an ASIC, a specific-use processor, or any existing computer processor. One or more steps or functions in the present disclosure may also be accomplished using machine-readable instructions and data structures stored on non-transitory, machine-readable media. For example, such media may comprise a floppy disc, CD-ROM, DVD-ROM, EEPROM, flash memory, or any other medium capable of storing the machine-executable instructions and data structures and capable of being accessed by a computer or other electronic device having a processor.

What is claimed is:

1. An ebullating pump system comprising:
    an ebullating pump having a motor and a variable frequency drive;
    sensors connected to the motor that directly measure voltage, current, and temperature of the motor;
    a frequency controller cooperative with the motor to track an operating frequency used by the variable frequency drive; and
    a computer-based pump monitor comprising a processor and a non-transitory memory connected to the processor, the non-transitory memory containing computer readable and executable instructions thereon that:
        receives sensor data from the sensors and the frequency controller;
        stores relationship data in a memory that relates an operating speed of the motor to torque;
        utilizes the processor to determine an expected torque using the data received from the frequency controller, the relationship data and at least one of frequency, voltage, current and temperature data to determine an actual torque for the pump during operation thereof by using at least one of the voltage, current and temperature of the sensor data, and to determine an apparent density of the fluid based on the expected torque and actual torque;
        uses the apparent density to detect a catalyst carryover condition while the pump is circulating at least a petroleum-based fluid; and
        generates a computerized alert to be sent automatically to an interface device to convey the computerized alert to a user upon detection of the catalyst carryover condition.

2. The ebullating pump system of claim 1, wherein the computerized alert is sent to another computing device that stores the computerized alert for later recall.

3. The ebullating pump system of claim 1, wherein the actual torque is determined by calculating rotational losses using the sensor data indicative of the temperature of the motor.

4. The ebullating pump system of claim 1, wherein the ebullating pump is a submersible pump.

5. The ebullating pump system of claim 1, wherein the ebullating pump is a positive displacement pump.

6. The ebullating pump system of claim 1, wherein the system comprises a catalyst density sensor located within the ebullated reactor to measure the density of a catalyst.

7. A method of operating a pump in an ebullated reactor, the method comprising:
    introducing a petroleum-based fluid and a hydrogen-containing gas into the ebullated reactor;
    using the pump to circulate at least the petroleum-based fluid through a catalyst bed that is disposed within the ebullated reactor;
    receiving sensor data directly measuring voltage, current and temperature of a pump motor that provides mechanical power to the pump during circulation of the petroleum-based fluid, the motor comprising a variable frequency drive;

receiving data by a frequency controller that is cooperative with the motor, the data corresponding to an operating frequency used by the variable frequency drive;

determining whether the pump is experiencing an irregular operating condition during the circulation of the petroleum-based fluid, the determining comprising:
generating an expected torque value for the pump by using the data corresponding to an operating frequency, at least one of the voltage, current and temperature of the sensor data and data from at least one set of speed-torque relationships;
generating an actual torque for the pump by using at least one of the operating frequency, speed-torque relationships, voltage, current and temperature data;
comparing the expected torque and the actual torque to determine an apparent density of the petroleum-based fluid that is being circulated by the pump; and
detecting whether catalyst carryover is present within the reactor based on the apparent density of the petroleum-based fluid.

8. The method of claim 7, wherein the sensor data further comprises data indicative of the density of a catalyst present within the fluid, and wherein the method further comprises determining volume fractions of gas, oil, and catalyst using the sensor data.

9. The method of claim 7, wherein the actual torque is determined by calculating rotational losses using the sensor data indicative of the temperature of the motor.

10. The method of claim 7, further comprising generating an alert and conveying the alert to a user upon detection of catalyst carryover.

11. The method of claim 10, wherein the at least the determining is performed using a computer.

12. The method of claim 11, further comprising sending the alert to another computing device that stores the alert for later recall.

13. The ebullating pump system of claim 6, wherein the system comprises an apparent density analyzer to determine the volume fraction of gas, oil, and catalyst inside the ebullated reactor based on the apparent density of the fluid and the density of the catalyst.

* * * * *